(12) United States Patent
Gunlock

(10) Patent No.: US 6,922,414 B1
(45) Date of Patent: Jul. 26, 2005

(54) APPARATUS AND METHOD FOR DYNAMIC COMMAND QUEUE DEPTH ADJUSTMENT FOR STORAGE AREA NETWORK NODES

(75) Inventor: Richard D. Gunlock, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 09/642,575

(22) Filed: Aug. 21, 2000

(51) Int. Cl.⁷ .............................................. H04L 12/24
(52) U.S. Cl. ...................... 370/412; 370/357; 370/400; 370/414; 707/100
(58) Field of Search ................................. 370/412, 351, 370/357, 360, 381, 382, 400, 401, 429, 389, 414, 415, 416, 417, 418, 428, 383, 462, 466, 349, 353, 395.7; 707/100, 202; 709/100, 222, 250, 226, 230; 710/107, 29, 33, 74, 5, 36; 711/5, 141, 162, 114, 170, 166; 714/6; 395/287

(56) References Cited

U.S. PATENT DOCUMENTS

| | | | |
|---|---|---|---|
| 5,260,945 A | | 11/1993 | Rodeheffer |
| 5,638,518 A | | 6/1997 | Malladi |
| 5,644,789 A | * | 7/1997 | Matthews et al. ............. 710/36 |
| 5,930,483 A | * | 7/1999 | Cummings et al. .......... 710/107 |
| 5,978,355 A | * | 11/1999 | Yamaguchi ............... 370/395.7 |
| 6,038,212 A | | 3/2000 | Galand et al. |
| 6,081,812 A | * | 6/2000 | Boggs et al. ............... 707/202 |
| 6,105,122 A | * | 8/2000 | Muller et al. ................... 712/1 |
| 6,327,669 B1 | | 12/2001 | Croslin |
| 6,377,543 B1 | | 4/2002 | Grover et al. |
| 6,389,010 B1 | * | 5/2002 | Kubler et al. ................ 370/353 |
| 6,389,432 B1 | | 5/2002 | Pothapragada et al. |
| 6,400,730 B1 | * | 6/2002 | Latif et al. ................... 370/466 |
| 6,434,620 B1 | * | 8/2002 | Boucher et al. ............ 709/230 |
| 6,457,050 B1 | | 9/2002 | Cowan et al. |
| 6,470,397 B1 | * | 10/2002 | Shah et al. ................... 709/250 |
| 6,502,162 B2 | * | 12/2002 | Blumenau et al. ............. 711/5 |
| 6,553,036 B1 | * | 4/2003 | Miller et al. ................. 370/462 |
| 6,594,698 B1 | * | 7/2003 | Chow et al. ................. 709/226 |
| 6,600,752 B1 | * | 7/2003 | Duong-Van .................. 370/412 |
| 6,601,187 B1 | * | 7/2003 | Sicola et al. .................... 714/6 |
| 6,606,630 B1 | | 8/2003 | Gunlock |
| 6,622,217 B2 | * | 9/2003 | Gharachorloo et al. ..... 711/141 |
| 6,625,161 B1 | * | 9/2003 | Su et al. ...................... 370/415 |
| 6,631,455 B1 | * | 10/2003 | Raza et al. .................. 711/170 |
| 6,643,795 B1 | * | 11/2003 | Sicola et al. .................... 714/6 |
| 6,647,016 B1 | * | 11/2003 | Isoda et al. ................. 370/412 |
| 6,658,478 B1 | | 12/2003 | Singhal et al. |
| 6,658,540 B1 | * | 12/2003 | Sicola et al. ................ 711/162 |
| 6,665,714 B1 | * | 12/2003 | Blumenau et al. .......... 709/222 |
| 6,711,632 B1 | * | 3/2004 | Chow et al. .................. 710/29 |
| 6,732,193 B1 | * | 5/2004 | Burton et al. .................. 710/5 |
| 2002/0034178 A1 | | 3/2002 | Schmidt et al. |

\* cited by examiner

*Primary Examiner*—Phirin Sam
*Assistant Examiner*—Anthony Ton

(57) ABSTRACT

An initiator node for a storage area network used with storage nodes having command queue capability maintains a current queue depth, and a maximum queue depth associated with each storage node. It initializing the maximum queue dependent on the type of the storage nodes it sees, and limits the number of commands queued to each storage node to the current queue depth associated with the storage node. It dynamically adjusts the current queue depth for each storage node based upon queue refusals generated by the storage nodes and the maximum queue depth associated with the storage nodes.

19 Claims, 13 Drawing Sheets

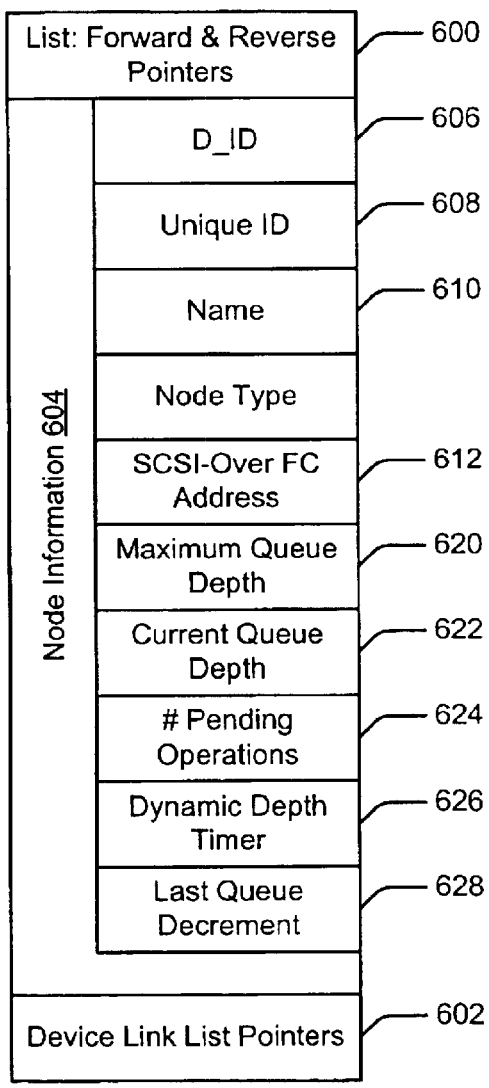
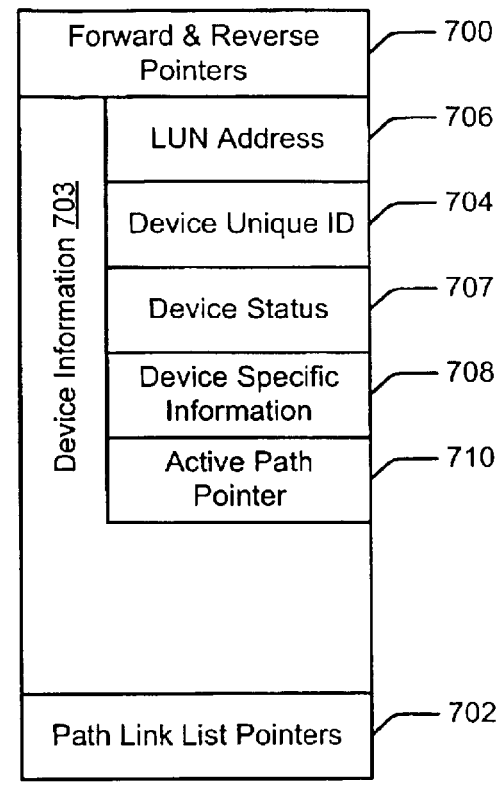
Fig. 6
Fig. 7

APPARATUS AND METHOD FOR DYNAMIC COMMAND QUEUE DEPTH ADJUSTMENT FOR STORAGE AREA NETWORK NODES

RELATED APPLICATIONS

This application is related to a simultaneously filed application entitled "Data Structure and Method for Tracking Network Topology in a Fibre Channel Port Driver", identified as Ser. No. 09/642,800. This application is also related to a simultaneously filed application entitled "Method for Recovery of Paths Between Storage Area Network Nodes with Probationary Period and Desperation Repair", identified as Ser. No. 09/642,801.

FIELD OF THE INVENTION

The invention relates to the field of computer networking. In particular, the invention relates to the field of nodes and switches for Fibre Channel storage-area networks. With more particularity, the invention relates to data structures for use by nodes in dynamically tracking network resources and configuration so as to properly encode and route packets over the network.

Nature of the Problem

Most modern computer networks, including switched and arbitrated-loop fibre-channel networks, are packet oriented. In these networks, data transmitted between machines is divided into chunks of size no greater than a predetermined maximum. Each chunk is typically packaged with a header and a trailer into a packet for transmission. In Fibre-Channel networks, packets are known as Frames.

A Fibre-Channel network having at least one switch is a switched Fibre-Channel fabric. A Fibre-Channel switch is a routing device generally capable of receiving frames, storing them, decoding destination information from headers, and forwarding them to their destination or another switch further along a path toward their destination. A network interface for connection of a machine to a Fibre Channel fabric is known as an N_port, and a machine attached to a Fibre-Channel network is known as a node. Nodes may be computers, or may be storage devices such as RAID systems. An NL_port is an N_port that supports additional arbitration required so that it may be connected either to a Fibre Channel Fabric or to a Fibre Channel Arbitrated Loop, and an L_port is a network interface for connecting a node to a Fibre Channel Arbitrated Loop.

A device including an N_port, L_port, or an NL_port together with hardware for high-speed connection to a machine is a fibre channel host bus adapter (physical HBA). For example, a physical HBA may comprise a printed circuit card having one or more NL_ports communicating through a PCI bus interface to an edge connector for connection to a PCI bus of a machine. A physical HBA may, but need not, also incorporate a processor for controlling its ports and its connection to the machine.

A Fibre Channel Switched Fabric may connect one or more Fibre Channel Arbitrated Loops.

In a switched fibre channel fabric, there may be more than one possible path, or sequence of links, loops, switches, routers, etc. that may be traversed by a frame, between two nodes. Multiple paths may be intentional, providing extra capacity or redundancy to protect against switch, node, or line failures, or may be unintentional consequences of network topology.

Multiple paths between two nodes may also be provided through multiple fibre channel arbitrated loops. For example, an initiator node may have two NL_ports, one connected to each of two fibre channel arbitrated loops. If each of these loops connects to an NL_port of a target node, then multiple paths from the initiator to the target node exist. This could provide redundancy should a failure occur on one of the arbitrated loops.

Fibre Channel storage-area-network (SAN) nodes and switches, especially network nodes having multiple ports, must keep track of a variety of information about the network and resources available over the network. This information is used by each node to format and properly route frames onto and over the network.

Typically, a program references files in storage by passing a command block to an operating system. At this level, the command block may reference files by name and device name, or by handle for files already opened. The operating system passes block I/O requests derived from the command block to an appropriate driver. The command block includes a command field, a file name field, and a drive name or number field in addition to other fields. The block I/O requests derived from the command block typically include fields for device identification, command, and a count of logical blocks to be operated upon, and may include pointers to data.

The device driver typically converts the block I/O requests into a sequence of one or more device level commands. Once the driver attempts to execute each command, it returns to the operating system a response having status information, and other information possibly including data read from storage. Information from the response may then be transferred to the program.

When a command block references storage accessible over a Fibre Channel network, the driver must encapsulate the device level commands into one or more command frames, and for write operations one or more data frames. The driver may use the network information to determine header information and routing for the one or more fibre channel network frames, or packets, that implement the command.

Typically, the operating system passes block I/O requests to the device driver with a device tag identifying the specific device intended to perform the desired operation. This tag may comprise a referenced device name, handle, or SCSI nexus, where a SCSI nexus includes bus identity, target device number, and logical unit number.

In particular, the driver must translate device tags, into a multilevel address as required to reach the indicated device. In a Fibre Channel context, that multilevel address field must include valid Destination Identification (D_ID) fields and routing information field for each frame. A command frame may specify a specific logical unit. There may also be additional destination address fields such as those in association headers; association headers permit addressing multiple devices or processes through a single fibre channel port.

The driver, especially a multiport driver servicing multiple ports, must therefore determine an appropriate destination and routing for each frame required to implement a command, and transmit those frame over a port appropriate for that routing. It is desirable that these translations and assignments be done quickly and accurately using network topology information maintained in a local topology database.

The command and data frames transmitted by a node in implementing an I/O command, together with any frames transmitted by another node in response to those command and data frames, is known as an exchange.

As nodes, switches, and links are added to or removed from the network, any local topology database must be updated to reflect valid devices on the network, and valid paths through the network to those devices. Nodes also may determine one or more paths of the valid paths to a given device to be an "active" path. An active path is a path that may be used for exchanges.

The Fibre Channel specifications define Class 1 and Class 4 services to be virtual-circuit, or connection, based services between pairs of nodes. Packets of a given sequence in these services must arrive in-order with respect to other packets of the same sequence. The specifications presume that frames transiting between nodes of each pair follow a virtual circuit between the nodes—all following the same path through the network from node to node and arriving in-order.

Links, loops, and switches of a network may fail.

Fibre channel networks may provide more than one path between a pair of nodes. Multiple, redundant, paths provide redundancy to allow continued communications between a pair of nodes should one or sometimes more, but not all, links, loops, or switches, and therefore paths through the network, fail.

Some existing fibre-channel systems can recognize failure of a path, switching traffic between a pair of nodes to an alternate path if one exists. This is known as failover of a path. Unfortunately, switching Class 1 and Class 4 fibre channel connections, and associated network traffic, to alternate paths is known to cause considerable delay to ongoing exchanges—on the order of seconds. These delays are caused in part by the need to ensure that Class 1 and Class 4 frames arrive at their destination in-order; time is allowed for flushing in-transit frames before frames are transmitted on the alternate path.

Further delay may occur if redundant controllers having access to the target device must transfer ownership of a logical unit as part of a path failover.

While a link or switch of a fibre channel network may fail, it may also be repaired. It is desirable that paths associated with repaired links, loops, or switches be dynamically returned to use to restore network redundancy and capacity.

Loops, links or switches may develop intermittent problems, where they may alternate between repaired and failed conditions. Considerable delay of network traffic can be encountered if paths through an intermittent device are used, since the delays associated with switching traffic to repaired paths, thence back to alternate paths upon the next failure may be cumulative. Paths may also be reported as repaired but actually have higher error rates. High error rates cause delay as frames are retransmitted as errors are detected; high error rates may also cause a path to be considered to have failed. It is therefore desirable to control use of repaired paths such that extended delay does not occur.

It is known that many nodes, including RAID storage subsystems, have the ability to queue multiple commands in a command queue for subsequent execution. For example, a RAID system may queue several read or write commands, received from one or more machines. Once queued, these commands are executed from the queue to or from cache, or to or from disk, in an order depending on availability of data in cache, disk availability and disk rotation. With proper interlocks, execution may often be in an order different from that in which the commands were received. Commands placed in a command queue of a node by an initiator node and not yet completed are pending commands. For this purpose, commands that are aborted, including those aborted for timeouts, are considered completed.

Commands that may be queued in these devices may include commands from multiple processes, or threads, running on a single node having one or more processors. For example, a transaction-processing system may have several processes running, each process requiring access to a different record of a database on a RAID system, all requesting access to the database at about the same time. Each process may create read, write, lock, or unlock commands for the database. Commands may also be queued from multiple nodes, where each node is running one or more processes or threads that require access to the device. Queuing and execution of each of these commands requires an exchange of frames between the machine and the device.

The maximum number, or queue depth, of commands that may be pending in any one device at any one time is finite and characteristic of the device. Each node may, but need not, know the queue depth of the device nodes it is attempting to use, and may throttle its commands appropriately. Typically, each node originating commands and transmitting them to the command queue of a device is unaware of the commands originated by other nodes and assumes it has the full queue depth of the device available to it.

If a node assumes that the full queue depth of a device is available to it, the queue depth of the device may be exceeded by commands from multiple nodes. When this happens, the excess commands are refused by the device and must be retransmitted later; the need for delay and retransmission degrades overall system performance. Conversely, if a node assumes that a device has only a small queue depth available to it, commands may be throttled unduly, such that overall system performance is impaired. It is desirable to adjust the maximum number of commands from each node transmitted to a device command queue in light of the command traffic to that device from other nodes of the network.

Manually tuned allocations of queue depth available to individual initiator nodes of a storage area network is possible, but is laborious and error prone. Further, it is known that the load on a system may vary from time to time throughout a day; it is desirable to change queue depth allocations as load changes for optimum performance.

Solution to the Problem

A driver for one or more Fibre Channel N_ports, L_ports, or NL_ports maintains a local network topology database. This database includes linked lists of host bus adapter (HBA) port records, target node records, and device records.

HBA port records correspond to individual physical N_ports, L_ports or NL_ports and are linked to node records through linked lists of node links. Similarly, node records are linked to device records through linked lists of device links, and devices are linked to node links through linked lists of path links. Additional HBA port records may be added as ports are discovered or as hot-pluggable ports are added to the system.

Each node record has information pertinent to a-particular port of a target node of the fibre channel network. A target node may have more than one port, and may therefore have more than one node record. Similarly, each device record has information pertinent to a particular device that can be accessed from one or more nodes. Each path link has information, including status information, pertinent to a particular path through a fibre channel fabric or arbitrated loop between a physical HBA port and a physical node or device of the network.

In order to reduce command queue overflow errors, a command queue depth variable is maintained for each node record. Initially, this is set to match a maximum queue depth determined from the type of node represented by the record. This queue depth variable is adjusted downwardly when queue overflow errors occur. Queue depth is also adjusted downwardly when other initiators are first detected on the fibre channel network, so as to allow those initiators to access the node. The queue depth is adjusted upwardly when a predetermined period elapses without queue overflow errors.

Nodes that have successfully accessed a target node without queue overflow errors automatically try successively higher values of queue depth until they find a depth for optimum performance. Further, queue depth is automatically reallocated to active nodes as other nodes become idle.

In order to limit dispatch of frames over intermittent or problem paths, with attendant errors and retries, freshly repaired and problem links and their associated paths are given probationary status. Frames are preferentially dispatched over non-probationary paths if any exist, if no non-probationary paths exist a probationary path may, in desperation, be returned to normal status. If no probationary paths exist, failed links are tested to determine if they have been repaired; a repaired path may then be activated bypassing the probationary state.

Probationary paths that function without error for a preset period of time are returned to normal status, where they may once again be subjected to normal use. Probationary paths that record excessive error counts are returned to failed status, unless these errors occur within a few seconds of another device logging into a fibre channel fabric; this prevents marking paths failed solely because of transient errors induced by nodes bringing their laser diodes online.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 6, a diagram of a node record of the topology database;

FIG. 7, a diagram of a device record of the topology database;

DETAILED DESCRIPTION

Context in Which the Invention Operates

Figure 1:
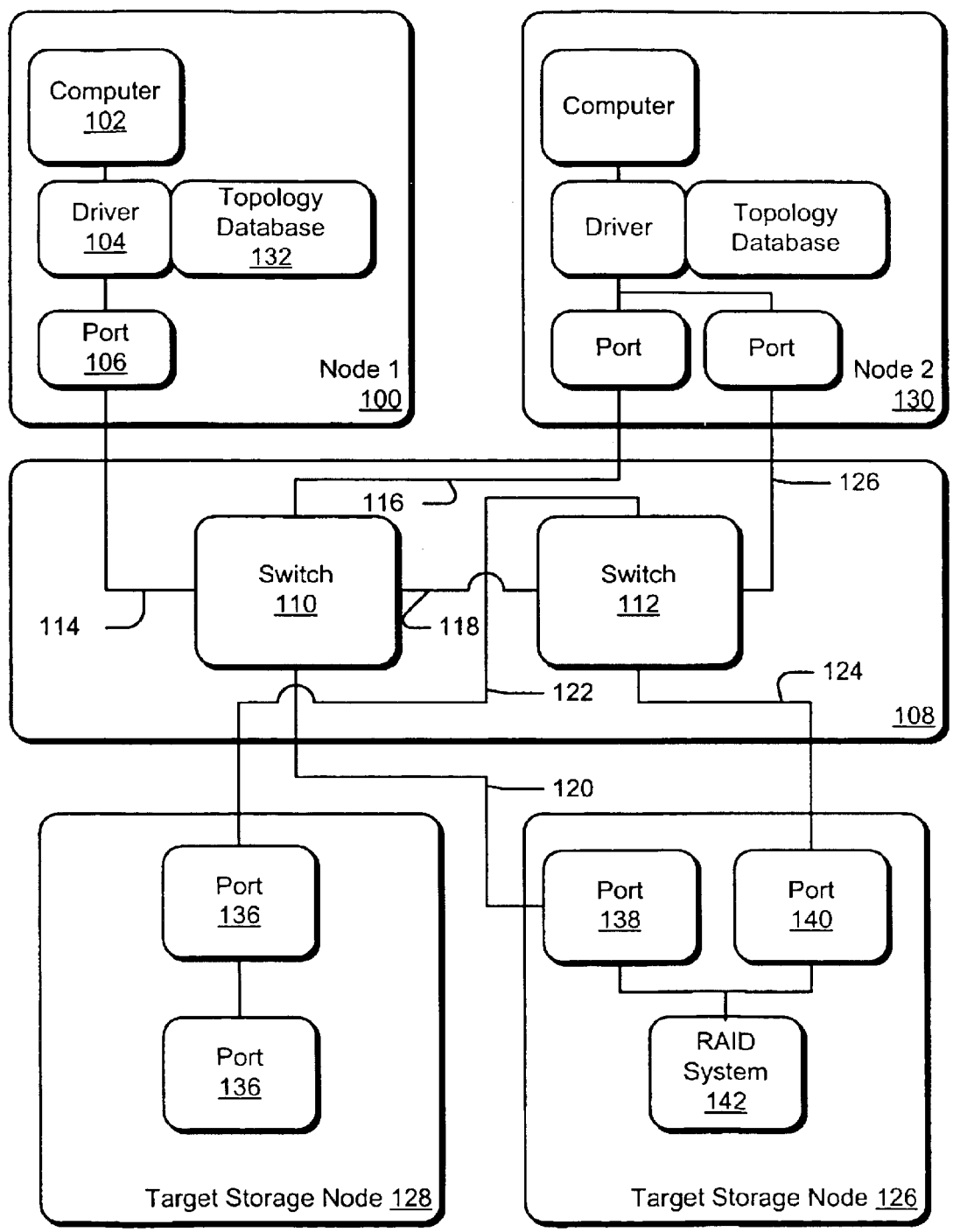
FIG. 1 is an illustration of a Switched Fibre Channel Fabric having several nodes with multiple paths between, and showing drivers and topology databases.

A Fibre-Channel network (FIG. 1) has a first node 100 that comprises a computer 102, a software or firmware driver 104 operating in either the computer or in a dedicated processor of a fiber channel interface card, and a fibre channel port 106. The network also has a fibre channel fabric 108 comprising one or more switches 110 and 112, a plurality of links 114, 116, 118, 120, 122, and 124, and at least one storage node 126 and 128. The network may also have one or more additional computer nodes, such as node 130.

The driver 104 maintains a network topology database 132. This database 132 contains information regarding the topology of the network as is useful for routing packets and determining destinations for valid packets.

Typically, driver 104 and topology database 132 reside in memory of the computer system of a node.

Figure 2:
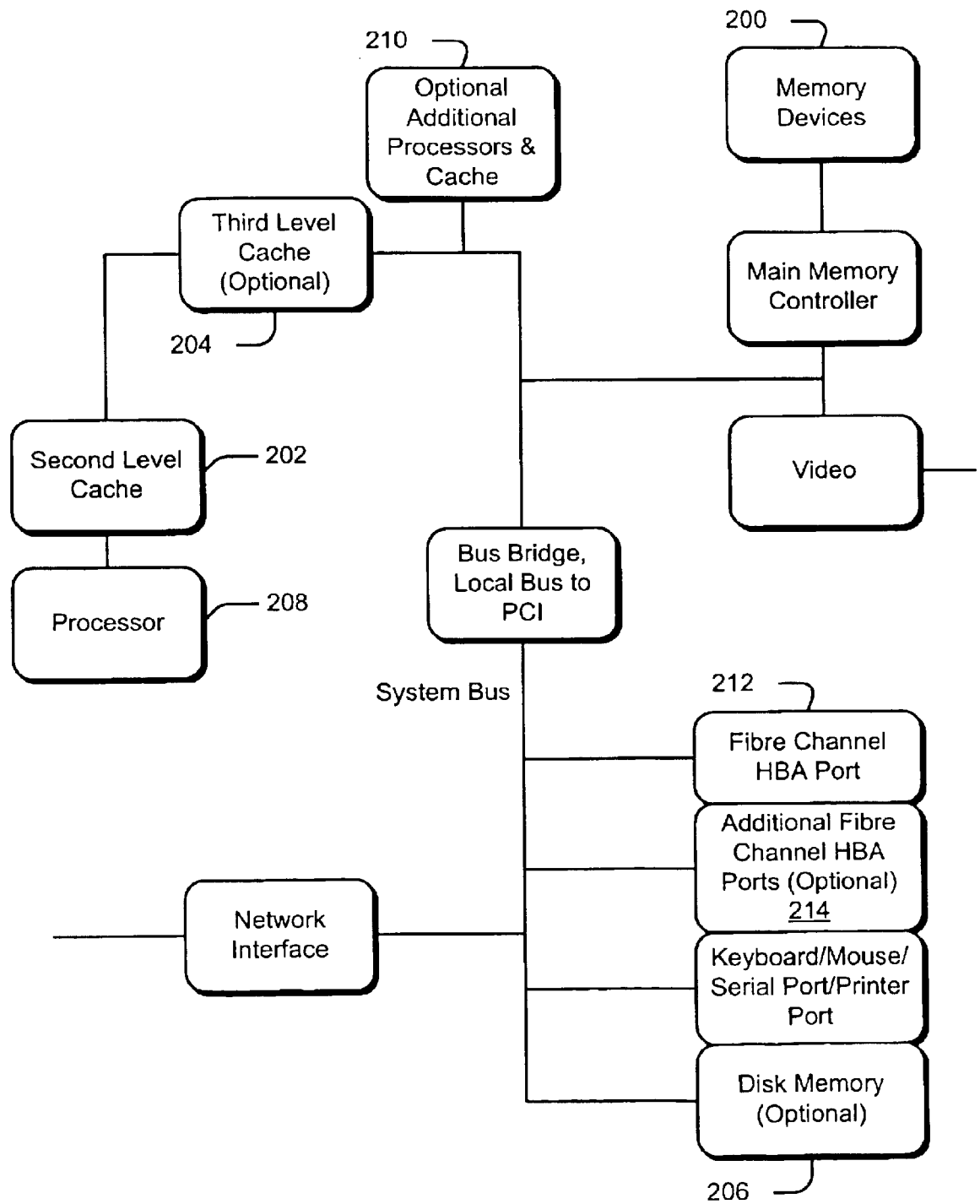
FIG. 2, a block diagram of a machine that may run a driver and topology database of the present invention and serve as a network node.

For example, portions of the driver 104 and topology database 132 may reside in main memory devices 200 (FIG. 2), caches 202 and 204, or disk memory 206 of the computer system. The driver 104 may execute in a first 208 or an additional 210 processor of the node. Typically, one or more fibre channel N_ports (node ports) are located on a host bus adapter (HBA) 212 attached to the computer system. Portions of the driver 104 and topology database 132 may also reside in local memory (not shown) of the HBA 212, for execution by an embedded processor (not shown) of the HBA. There may be an additional HBA 214, or an additional port of the HBA 212. The one or more levels of cache memory 204, main memory 200, local disk 206 of the node, and local memory of the HBA, together form a memory system of the node, which stores the driver and the network topology database.

Figure 3:
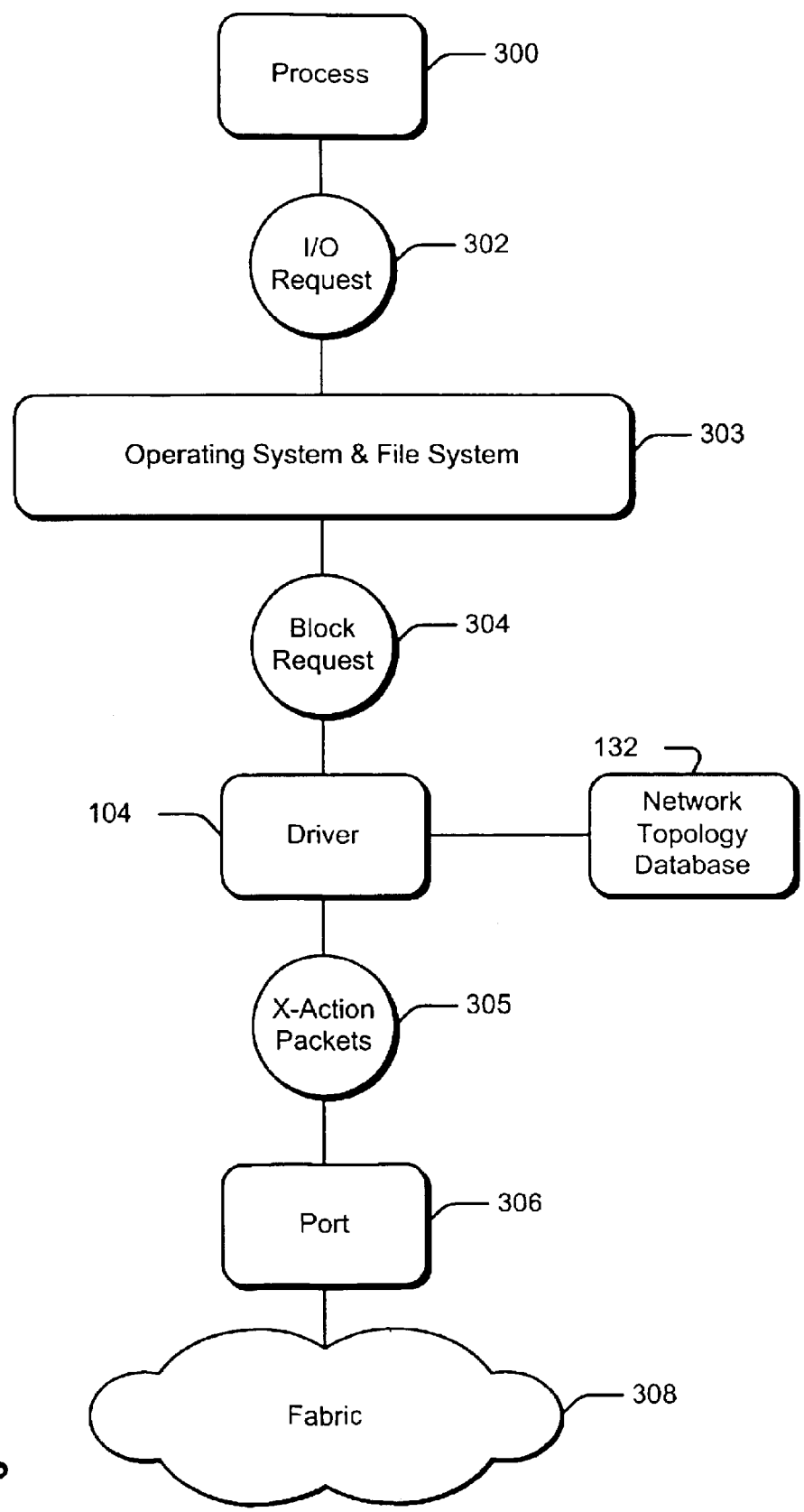
FIG. 3, a block diagram illustrating where a local network information database resides in a system running on a network node.

Whenever a process 300 (FIG. 3) executing on the first 208 (FIG. 2) or additional 210 processor of the node generates an I/O request 302, the request is processed by the operating system 303 to determine which driver should handle the transaction. The request may also be translated into block I/O requests 304 for accessing specific blocks of storage, including blocks of directories as well as blocks of data files. Those block I/O requests accessing fibre-channel-accessible devices are passed to the driver 104, which breaks these transactions into packets 305 for the indicated transaction. Packets 305 are processed by the driver 104 to include a valid header, and dispatched to one of one or more ports 306 for dispatch into the network fabric 308 or arbitrated loop.

Network Topology Database Structure

HBA Port List

Figure 4:
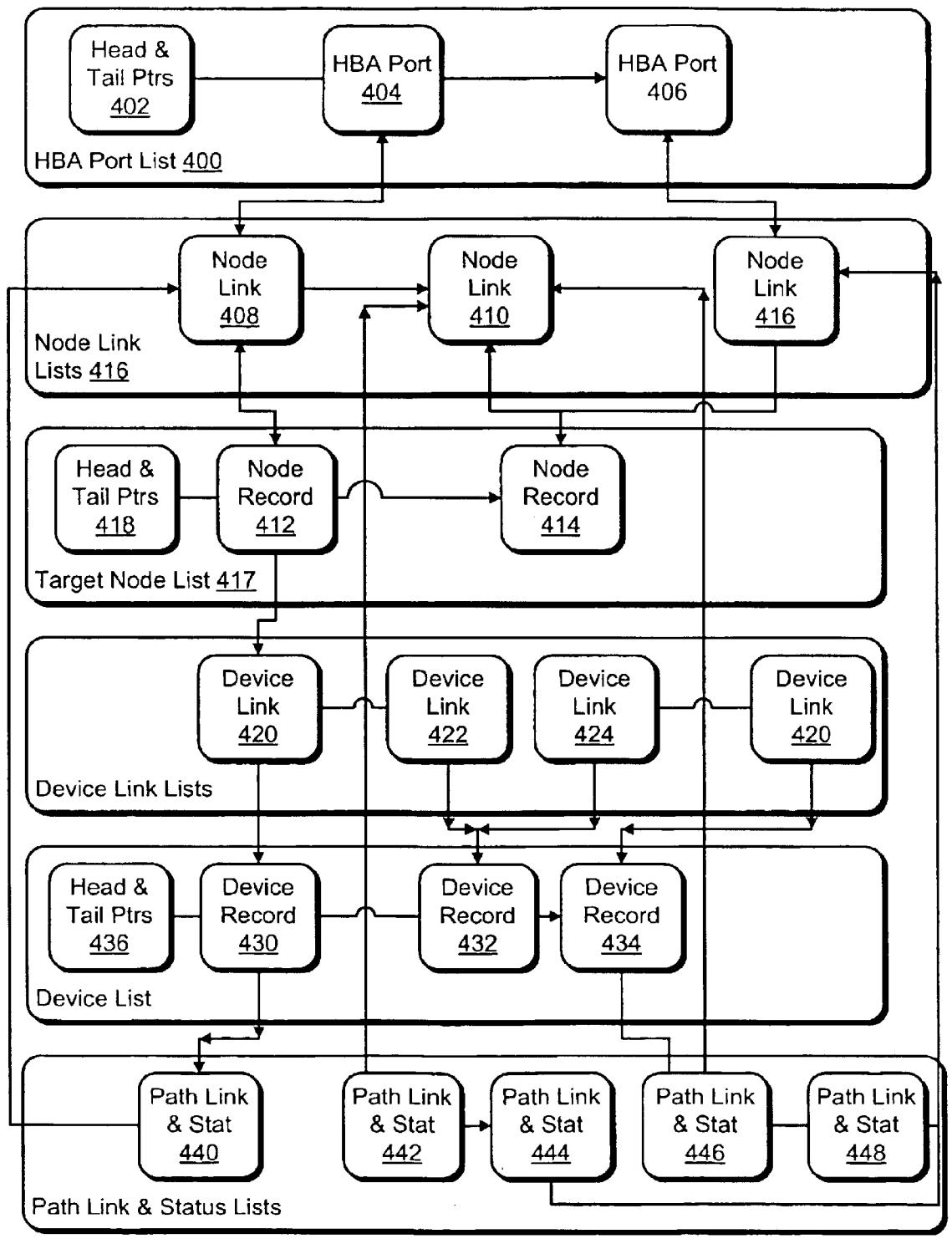
FIG. 4, an illustration of a data structure for a local network information database as maintained on a node of the present invention.

Dispatch of packets to the one of one or more ports is controlled by information from the network topology database 132. Within this database as detailed in FIG. 4, is maintained an HBA port list 400. Within this list is a pair of head and tail pointers 402 and an HBA Port Record (404 and 406) for each N_Port of an HBA on the system.

Each HBA Port Record (404 and 406) incorporates port status information. The HBA Port Record also incorporates the timers and failure counters necessary for implementing probationary paths.

Additional HBA port records may be added as ports are discovered or as hot-pluggable ports are added to the system.

Node Links

Each HBA port record, such as HBA port record 404, contains head and tail pointers to a linked list of Node Links 408 and 410. Each Node Link 408 contains a pointer to a node record, such as node records 412 and 414. The node record contains routing information required for dispatch of packets over the network from an associated hardware HBA port 212 or 214 to a specific target port of a target node of the storage area network. Target nodes of the storage area network may be storage nodes, such as storage nodes 126 and 128 (FIG. 1), or may be processor nodes such as node 130. Each target node has one or more NL_ports, L_ports, or N_ports 136, 138 and 140, through which it attaches to the fabric 108.

Mode Records

Each node record 412 and 414 has information relevant to a target node of the network. Each node record reachable through pointers in one or more node links, node record 414 is accessible through node link 410 and 416. The node records, including node records 412 and 414, are linked together as a linked target node list 417 accessible through target node list head and tail pointers 418.

Device Links

Each node record also contains pointers to a list of device links, such as device links 420, 422, 424, and 426, associated with that node record. As illustrated, node record 412 has pointers to a device link list containing device links 420 and 422, while node record 414 has pointers to a device link list containing device links 424 and 426. Each device link points to a device record, such as device records 430, 432, and 434.

Device Records

Device records, such as device records 430, 432, and 434, include information relevant to individual devices. Each device may be accessible through more than one node or port. For example, a RAID disk array 142 (FIG. 1), that may be accessed through two RAID controllers having ports 138 and 140, would have a corresponding device record accessible through multiple node records and device links.

The device records 430, 432, and 434 are linked together with a set of head and tail pointers 436 into a searchable device list 438.

Path Links

Each device record, such as device records 430, 432, and 434, also has pointers to associated lists of path links 440, 442, 444, 446, and 448. Each path link points to a node link, such as node links 408, 410, or 416, of the topology database; and corresponds to a physical path through the network from an HBA port to the target node and device. Each path link also has status information about the corresponding path.

The network topology database of FIG. 4 as drawn does not reflect the specific structure of the example network of FIG. 1. Each figure is by way of example, showing the types of records and their linkages, or nodes and devices; the topology database is configured automatically to represent any of a large variety of possible networks.

Detail of Network Topology Database Structure

Node Record Detail

A node record, such a node record 412, is shown in more detail in FIG. 6. Referring to FIGS. 6 and 4, included in the record are forward and reverse list pointers 600 for linking the record to the target node list pointers 418 and to other node records such as node record 414. There are also device-link list pointers 602 for accessing the list of device links, such as device links 420 and 422. The device-link list pointers 602 are therefore pointers through which associated device records may be located.

Each node record also has node information 604 about the corresponding node of the network, including node identity information. The node identity information includes the destination ID (D_ID) 606 required for routing frames to the node, and node identifying information including a globally unique identifier 608 for the node and port. This identifier is unique among all the nodes of the storage area network. The node identity information may incorporate a node name 610. The globally unique identifier 608 may comprise the node name 610 and a port name associated with the HBA port record through which the node record is reachable since the combination of port name and node name is unique in the network. The node identity information permits determination of whether nodes logging in through a port have already been seen through another port. There may also be information for use in higher levels of protocol, such as a SCSI address 612 for use with SCSI-over-Fibre-Channel protocols.

The node information also has a number of fields used to manage command queues. These include a maximum queue depth 620 for the node, a current queue depth 622, a number of pending operations 624, a timer 626, and a queue depth decrement field 628 for logging the time of the most recent queue depth reduction due to a queue depth refusal.

Device Record Detail

A device record such as device record 430 has forward and reverse pointers 700 (FIG. 7) through which it is linked to the device list pointers 436 and other device records. There are also path link list pointers 702 to any associated list of path links, and device information 703. Included in the device information 703 is device identification 704, including a device name for user access to the device. The device identification 704 may also include unique device identification, such as device serial numbers. The device information 703 also includes any logical unit number 706 needed to reference the device, device type, status 707, and other device specific information 708 of interest to the driver.

Path Link Detail

Figure 8:
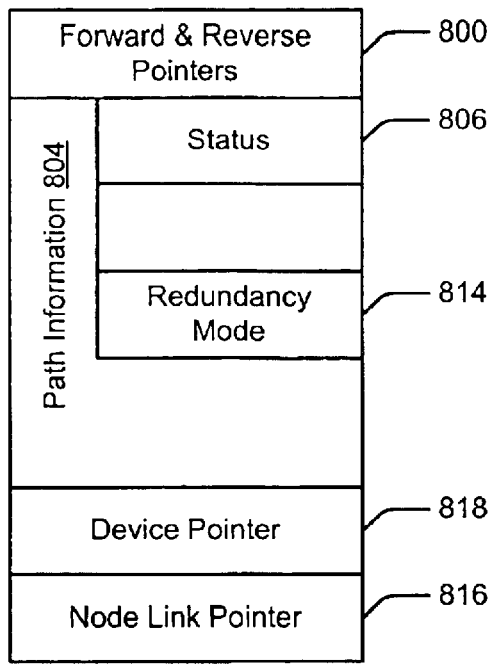
FIG. 8, a diagram of a path link of the topology database.

Each path link, such as path link 440, has list pointers 800 (FIG. 8) for linking it with the associated path link list pointers 702 in the associated device record and to any other path links associated with the device. The path link also has path information 804, including path status 806, and redundancy mode information 814. There is also a pointer 816 to an associated node link and a reverse pointer 818 pointing back to the associated device.

Path status 806 includes information indicating which path, of possibly multiple paths, is an active path on which frames should be sent, and which paths are standby paths. It may also include path failure flags.

Node Link Detail

Each node link, such as node link 408, has pointers 900 for linking with pointers of an HBA port record and other node links into a node link list. Each node link list has at least one link for each and every network node accessible through a particular HBA port. Each node link also has an HBA pointer 902 to the associated HBA Port record, and a node pointer 904 to a node record of the target node list. Each node link also has route information, including a login delay timer 906 for suppressing traffic while node login is in progress.

The node link may also have routing information 908 for controlling routing of frames through the network fabric.

HBA Port Record Detail

Figure 9A:
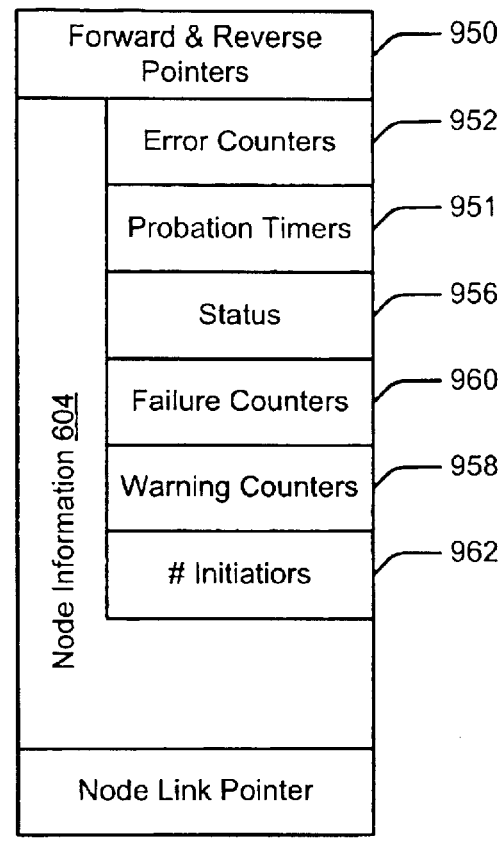
FIG. 9A, a diagram of an HBA-port record of the topology database.

Each HBA port record, such as HBA port record 404, has forward and reverse pointers 950 (FIG. 9A) for linking it to other HBA port records, such as HBA port record 406. The HBA port record also has error counters 952, probation timers 954, status flags 956, warning counters 958 and failure counters 960 for implementing the unstable link detection, link failure, and probationary repair algorithm herein described. The HBA port record also has node link pointers 962 for pointing to node links.

Network Topology Database Operation

Topology Maintenance

Fibre channel networks are dynamic; nodes may appear or disappear as the network operates, paths may fail or be repaired, and devices may appear or disappear. Host bus adapters may be enabled, added, disabled, removed, or replaced while the system is running, as may individual links. Consider the case when a target node logs into the fabric, and appears to an HBA port 406 (FIG. 4). In this event, the target node list 417 is searched from head and tail pointers 418 for a node record having the same node identity. If a node record, such as record 414, is found, node link 416 is added to the database to indicate that the node can be reached through the relevant port 406 as well as through any other port it is reachable through, such as port 404. If no matching node record is found, a new node record is created and linked with a new node link. An inquiry is made of the new node to determine what devices it supports—if any.

Similarly, when a node reports the devices it supports, the device list 438 can be searched for a device record corresponding to each device for the same device appearing through any other node. If a matching device record is found, new device links are created to link the node record to the device record and a new path link is created to indicate the new path through the node; if no matching device is found new device links are created and linked to a new device record that is linked into the device list.

Each node record has forward and reverse list pointers to facilitate dynamic addition and deletion of node structures to the list.

The device and node lists are empty of device structures when the driver is started, device structures are added to the device list as the driver logs into the network and discovers its topology. Each device record also has forward and reverse list pointers to facilitate dynamic addition and deletion of device structures to the list.

The HBA port list is also empty at driver initialization. The driver discovers any physical N, L, or NL ports and adds HBA port records as required.

Frame Dispatch with the Topology Database

Figure 5:
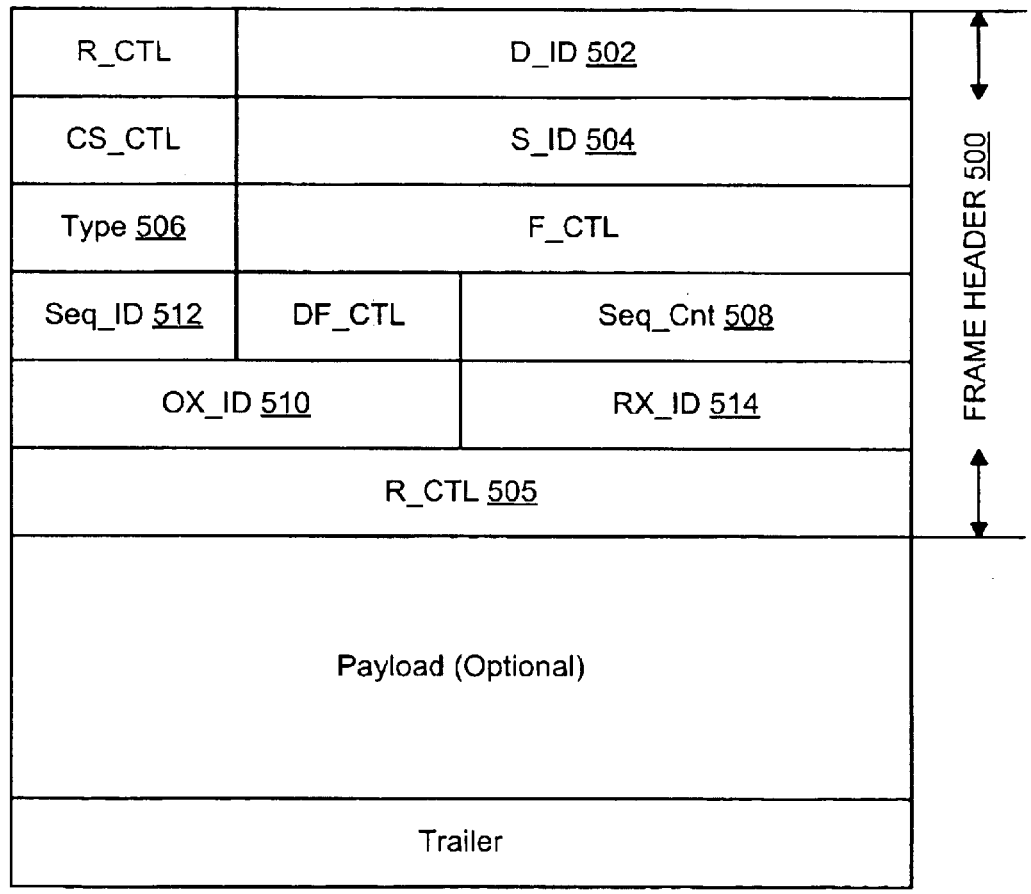
FIG. 5, an illustration of a fibre channel frame, or packet, header, as is known in the art.

Fibre channel frames, or packets, are known to have a structure as illustrated in FIG. 5. Each frame has a header 500 that includes a destination identification field (D_ID) 502, a source identification field (S_ID) 504, a routing control field (R_CTL) 505, and a frame type 506. There are also sequence count (SEQ_CNT) 508, indicating where the frame is in a sequence, originator exchange identity (OX_ID) 510, sequence in transaction identity (Seq_ID) 512 and receiver exchange identity (RX_ID) 514 fields for identifying a frame of an exchange. In most fibre channel networks, the D_ID field 502, type 506, and routing control fields 505 influence the path followed by the packet from source to destination. The S_ID field 504 influences the path followed by any reply frame.

Consider the case where a process desires access to a specific device by name rather than with a tag. The device may be located by searching from the pointers 436 (FIG. 4) of the device list 438 of the network topology database for a device record having the desired device name, such as device record 432. A pointer to this record may be returned as a handle or tag to the calling routine to expedite later access. The list of path links 442 and 444 associated with this device record 432 is then searched for a path link having active status; the associated node link 416 may then be located. Alternatively, an active path pointer 710, pointing to a currently active path link, may be stored in the device record. If no path link has active status, a path link having standby or probationary status may be made active and used instead.

Following the node link pointer 816 of the path link 416, through the node record pointer 904 of the node link, the associated node record 414 is found. From the node record is read the outbound D_ID, and other relevant information, for packets intended for the specific device.

From the node link 416, pointer 902 is followed to the associated HBA port record 406 to determine the port on which the packets intended for the device should be transmitted, and thereby identify the port that should appear in the S_ID field of the frame.

Once the D_ID and S_ID fields of the frame are determined, along with any relevant routing control information, the frame is dispatched into the fabric or onto the arbitrated loop.

Dynamic Control of Command Queue Depth

Target nodes often have a command queue associated with them. These nodes may receive and buffer a finite number of queuable commands, which are then executed. As known in the art, these commands need not be executed in order. When an attempt is made to queue more commands than the command queue can hold, excess command exchanges are terminated with queue overflow errors—these commands generally must be re-queued by the initiator node.

Command queue overflow errors are limited through a dynamically-adjusted command queue depth 622 (FIG. 6) and a number of pending operations 624 maintained in each node record. The maximum queue depth 620 is initialized to a maximum queue depth suitable for the type of the target node when the node logs into the target node and the node record is created; a minimum queue depth (not shown) is also established for each node. The current queue depth 622 is set to the maximum of the minimum queue depth or the maximum queue depth 620 divided by the number of initiators visible to the HBA port. The number of initiators 962 seen logged into the network and visible to the HBA port then maintained in the HBA port record.

Each time a new I/O operation is requested, the number of pending operations 624 is compared to the current queue depth 622 for the target node of the operation. If the new operation is of a queueable type and will cause the current queue depth 622 to be exceeded, the new operation is linked to a delayed operation queue. These operations will be performed when currently executing operations complete or abort.

If the new operation will not cause the current queue depth 622 to be exceeded, the number of pending operations 624 is incremented, and frames are transmitted as required to initiate the operation.

Figure 10:
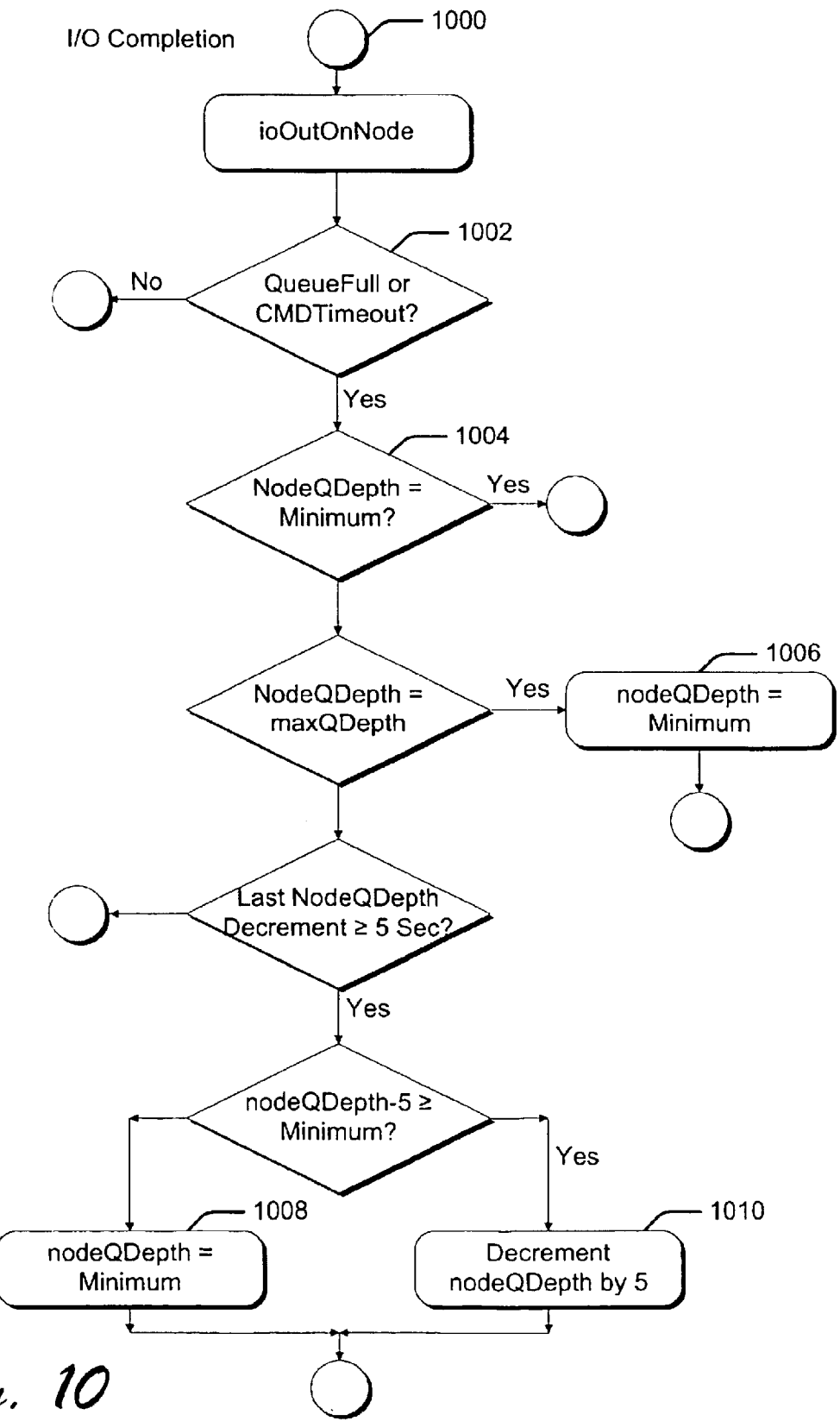
FIG. 10, a flowchart of dynamic queue depth throttling operations performed upon completion of an exchange.

When I/O operation exchanges terminate 1000 (FIG. 10), frames returned by the target node are tested 1002 for queue overflow errors. If a queue overflow error occurs, its time is compared to the last queue decrement time 628, the prior contents of the last queue decrement time being used to permit downward adjustment of queue depth at a maximum rate of once every five seconds. If downward adjustment of queue depth is done, the last queue decrement time 628 is updated. The current queue depth 622 is checked 1004 to determine if it is already at the minimum value. If a queue overflow error occurs with the queue depth at other than the minimum value, the current queue depth 622 is adjusted downwardly. The downward adjustment is either by five 1010, or to the minimum value 1006 or 1008, depending on the value of the queue depth and the prior contents of the last queue refusal variable.

Figure 11:
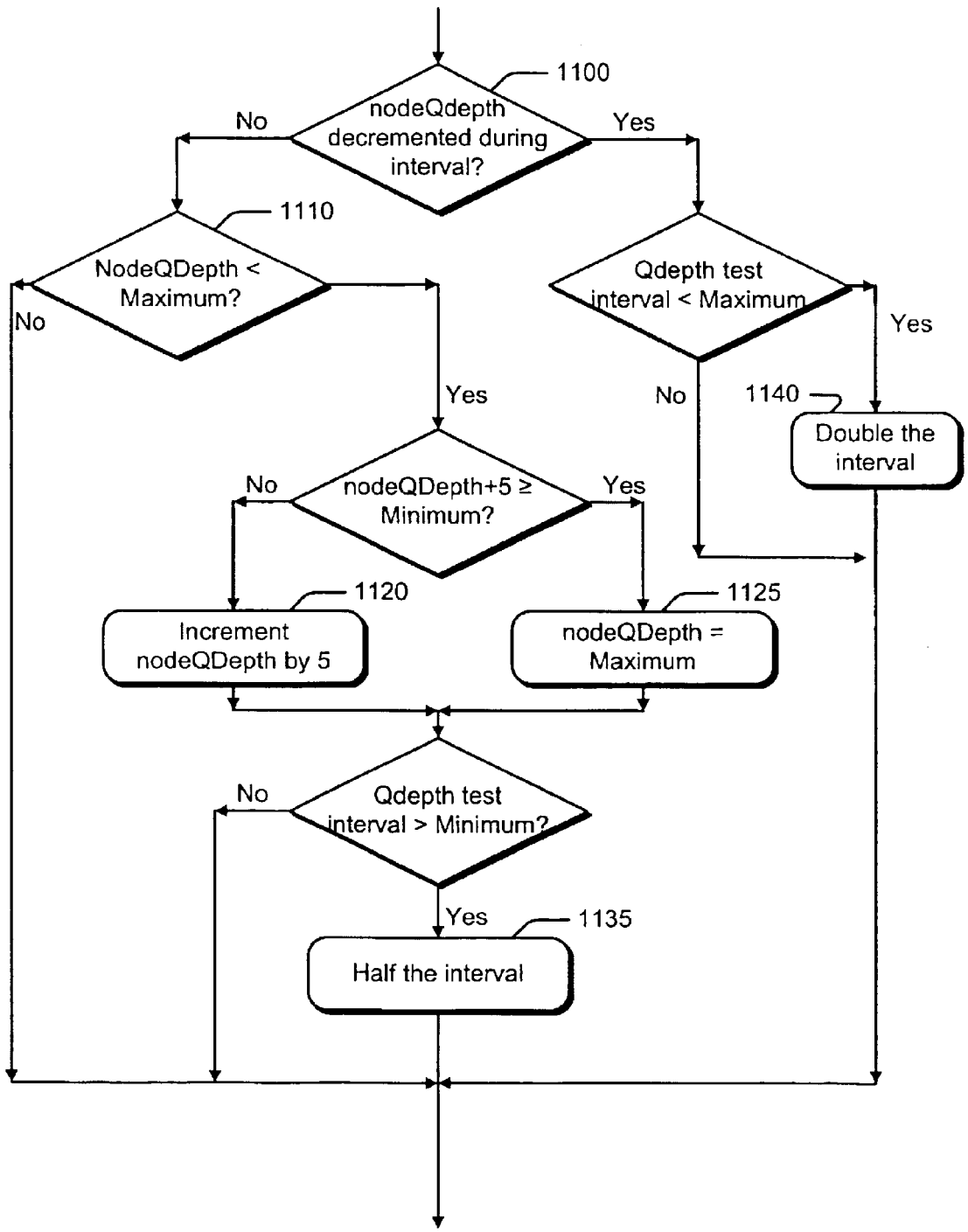
FIG. 11, a flowchart of dynamic queue depth throttling performed periodically.

A timer triggers periodic reexamination of current queue depth. Upon expiration of the timer, the last queue decrement time 628 is checked 1100 (FIG. 11) to determine if the current queue depth was decreased since the timer last expired. If not, and the current queue depth 622 is less than maximum 1110, the current queue depth 622 is adjusted upwardly by five 1120 or to maximum 1125, and the timer is restarted.

In an embodiment, the timer expiration interval is also dynamically adjusted between a minimum and maximum value during operation. The timer interval is decreased 1135 when it is greater than minimum and current queue depth 622 is adjusted upwardly; the timer interval is increased 1140 when it is less than maximum and no adjustment to the queue depth 622 has been made since the most recent previous timer expiration. Timer expiration interval decreases serve to allow for rapid convergence upon optimal performance, timer expiration interval increases serve to avoid excess processing time when the queue depth is likely already at the maximum usable queue depth.

In order to provide queue capacity to compute or initiator nodes that have just logged into the storage area network, a list (not shown) of known initiators is maintained in the network topology database 132. The node on which the network topology database 132 resides can see some logins by other initiators to the storage area network.

Figure 12:
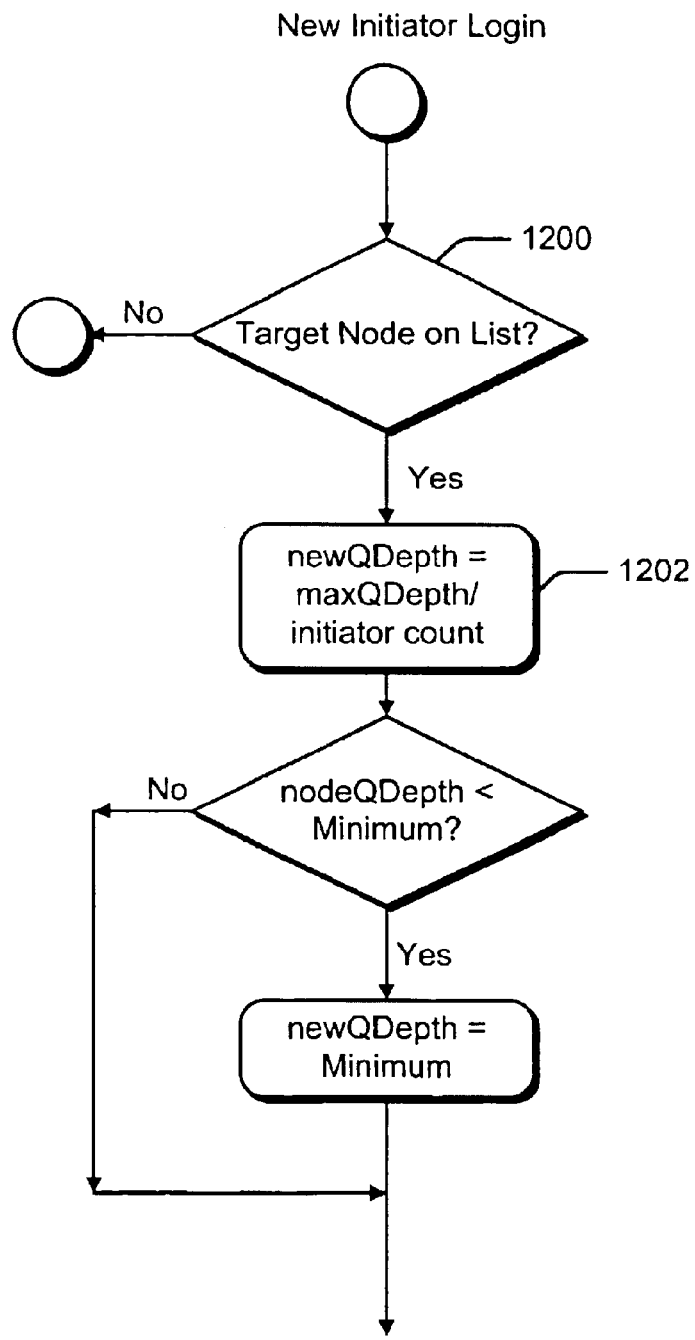
FIG. 12, a flowchart of dynamic queue depth throttling operations performed when another initiator node logs into the storage area network.

Each time a login by a new initiator node to the fabric is seen, where the new initiator node has access to a target node, the target node list 418 of the network topology database 132 is searched 1200 (FIG. 12) to find any node record, such as node record 412, that is likely to be addressed by that newly logged-in initiator node.

If a node record is found that may be a target node of the newly logged-in initiator node, the current queue depth 622 of the node record is reduced 1202 to the greater of the minimum queue depth for that node and the maximum queue depth divided by the number of initiators 962 now known to be logged into the associated HBA port.

Since the current queue depth 622 is maintained in the node record, there are one or more separate current queue depth variables for each target node of the network. These variables are adjusted independently; different target nodes may therefore have different current queue depth 622 associated with them. Similarly, there are separate numbers (or counts) of pending operations 624 maintained in the node records, each corresponding to different pairings of N_port, L_port, or NL_port to a target node of the network.

Recovery and Probation of Failed Paths

Each physical path set up through the network from an initiator node to a target node is associated with an HBA port record and a path link, as heretofore described. The path link has a status flag 806 (FIG. 8), which may have the conditions Active, or Normal, among other possible status conditions. The HBA port record has further status information regarding the path and particularly relevant to status of the physical link between the physical HBA port corresponding to the HBA port record and the fabric.

In order to limit dispatch of frames over intermittent or problem links and paths, with attendant errors and retries, freshly repaired and problem paths are given probationary status. Frames are preferentially dispatched over non-probationary paths if any exist, if no non-probationary paths exist a probationary path may, in desperation, be returned to active status when they become available for frames.

Figure 13:
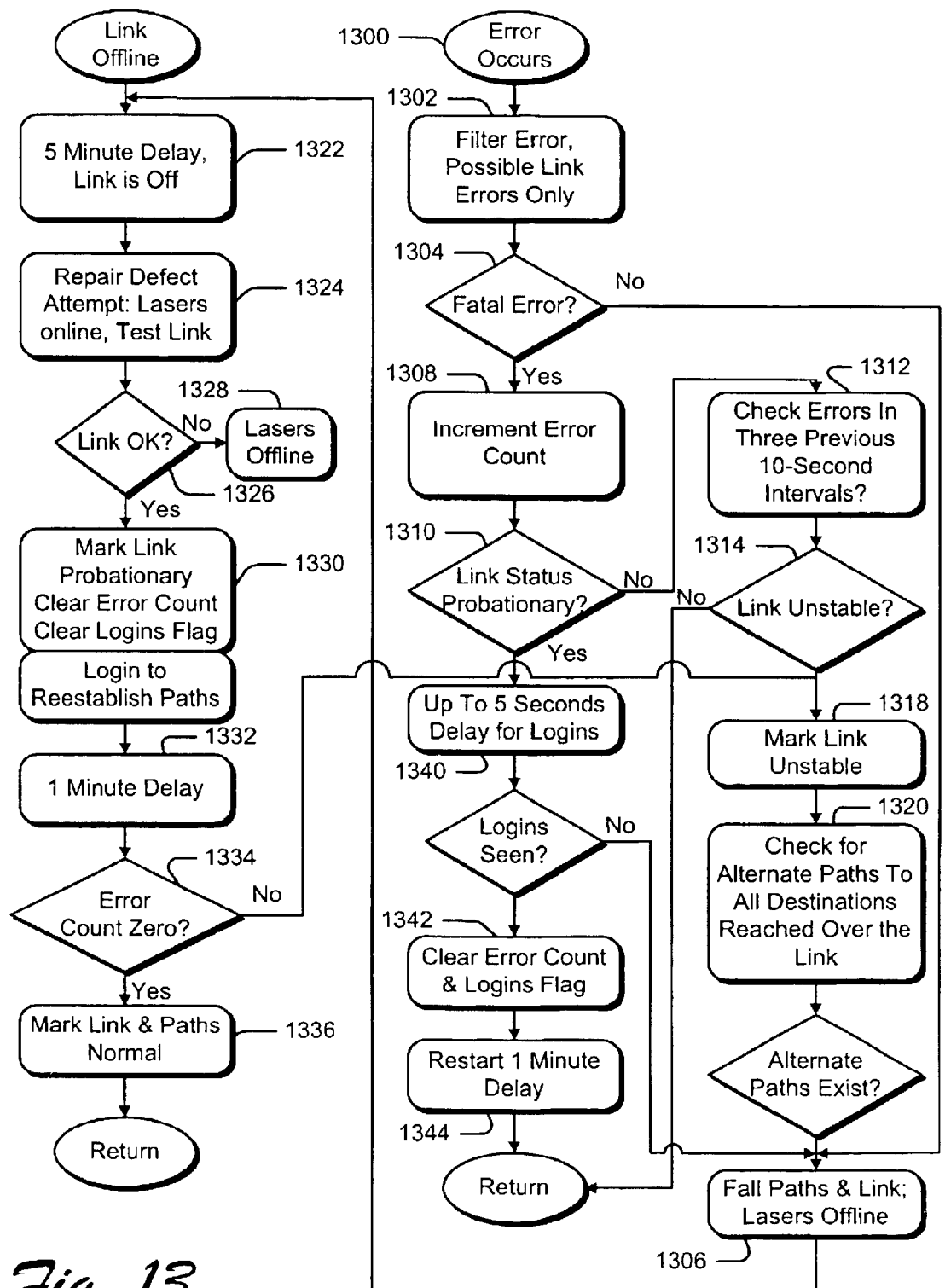
FIG. 13, a flowchart illustrating some steps of probationary repair of unstable or failed links FIG. 14, a flowchart illustrating actions taken when a path is detected repaired.

Each time an error is detected 1300, a routine (FIG. 13) is invoked for logging that error against the link and path used for the exchange. Errors are filtered 1302 to exclude errors not potentially related to a failed or unstable link, and evaluated for error severity. Severe errors 1304 may cause the link to be marked failed 1306 immediately in the HBA port record and the HBA port's laser diodes taken off-line. Less serious errors are counted 1308, with the link marked failed or marked unstable only if high numbers of these errors are encountered.

Errors on non-probationary links are identified 1310, and binned into 10-second intervals. Records are maintained 1312 for four consecutive 10-second intervals. Only if errors are found in the current 10-second interval and three immediately previous 10-second intervals is a link considered unstable 1314. If the link is not unstable, retransmission may be attempted or error reported, and the error routine returns 1316.

If the link is determined unstable 1314, the HBA port record is marked unstable 1318 and a search 1320 is made in the topology database for alternate paths to all destinations reached over that link. Failover is done for those paths for which alternate paths exist. If any path does not have an alternate, the error routine returns 1316 without failing the link 1306 or taking the laser diodes off-line.

Whenever the laser diodes for a link are taken off-line, a 5-minute delay 1322 timer is started. When this timer expires, or all other paths to a node previously reachable over that link fail, a repair detection attempt 1324 is made on that link. Repair detection requires that the laser diodes be brought back on line and link testing be performed. If the link test 1326 fails, the laser diodes are taken back offline 1328 and the 5-minute delay 1322 restarted.

Figure 9:
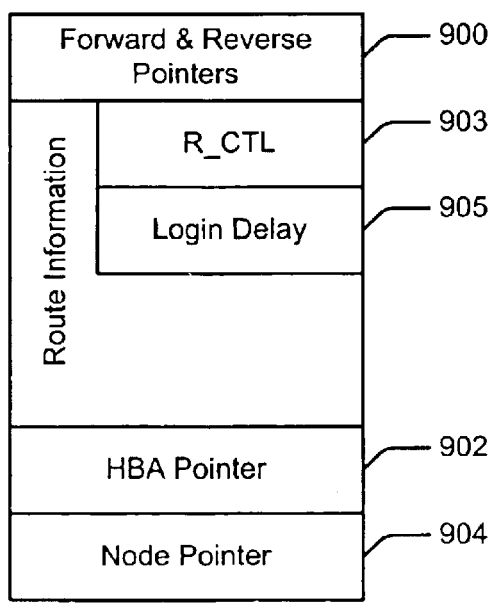
FIG. 9, a diagram of a node link of the topology database.

If the link test passes, the link is marked 1330 probationary in the HBA port record (FIG. 9). The link error and warning counters 952 are cleared and a one minute restartable and cancellable probation timer 956 and 1332 (FIG. 13) is started. Login attempts are begun to reestablish paths from this port to all accessible target nodes reachable over this port, including those accessible target nodes that were formerly reachable over this port.

Upon expiration of the one minute probation timer 1332, the logged error count 952 on the link is checked 1334 to verify that it is zero. If no errors have occurred on the link, the link and associated paths are marked 1336 normal status. If errors occurred without their having been associated with logins, as discussed below, the link is treated as still unstable 1318, and may be marked failed 1306 and the laser diodes once again taken off-line.

Should errors occur on a probationary path 1310, a five-second login window delay 1340 is started. Should any login by another node be observed during this five-second delay, the errors are considered to be related to that login. The error counter 952 is cleared 1342 and the one-minute probation delay 1332 is restarted 1344.

Figure 14:
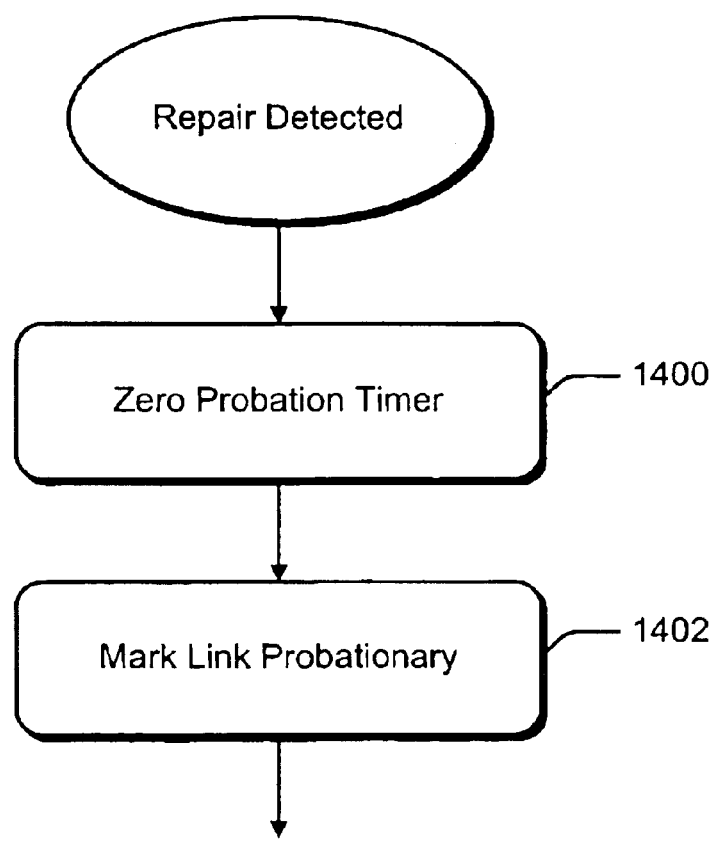

Each time a path is detected repaired (FIG. 14), a firmware or software timer associated with that link is cleared 1400 in the HBA port record. The link is also mark ed probationary 1402.

Figure 15:
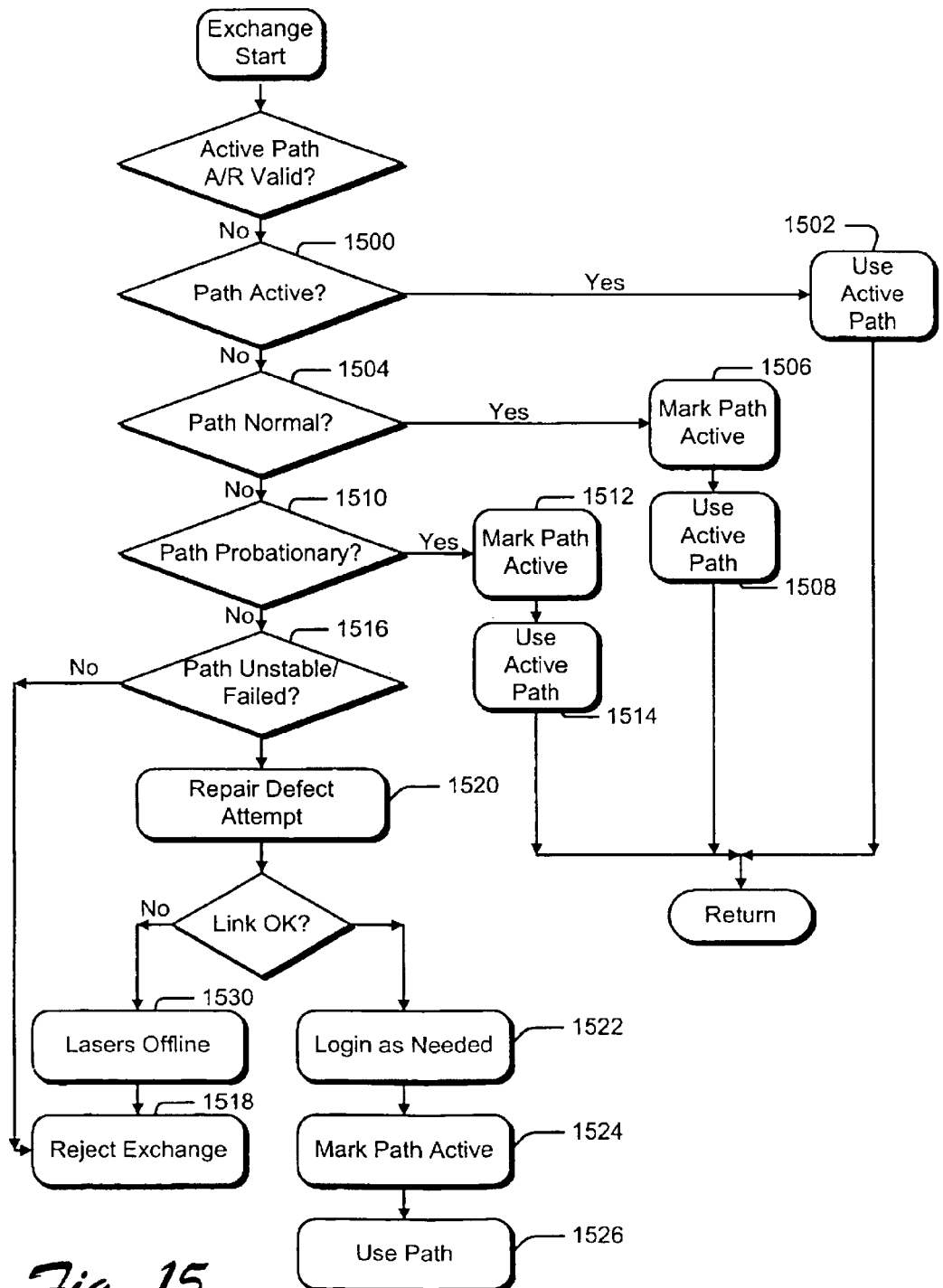
FIG. 15, a flowchart illustrating actions taken when the first frame of an exchange is transmitted.

When an attempt to transmit an exchange is made (FIG. 15), the active path pointer 710 (FIG. 7) is followed to see if it points to a valid active path. If that pointer does not point to a currently valid and active path, or it points to a failed path, a search 1500 is made among the path links for an active path. If an active path is found, the associated frames are transmitted on that path 1502, this may be an active path over an unstable link if no alternate path exists. If no path is marked active, a search 1504 is made for one or more paths marked normal. If one or more paths marked normal exist, one of those paths is selected, marked active 1506, and used to transmit 1508 the frame. If no path marked Normal exists, a search 1510 is made for one or more paths associated with a link marked probationary. If one or more paths marked Probationary exist, one of those paths is selected, marked active 1512, and used to transmit 1514 the frame. Any associated one-minute probation timer or five-second error login window timer is cancelled. In this way, a Probationary path may be made active in a desperation recovery.

If no active, normal, or probationary path is found, a search is made 1516 for a path taken off-line as unstable or failed. If none is found, the exchange attempt is rejected 1518 since there is no path on which it can be sent. If such an offline path is found, a repair detect attempt 1520 is made; this requires bringing the laser diodes back online and testing the associated link. If the link tests good, any required logins 1522 are done, the path is marked active 1524 in the path link, any other paths through the link are marked normal, and the path is used 1526 to transmit the frame. In this way, an offline link may be made active in a desperation recovery. If the link tests bad, the laser diodes are taken back offline 1530 and the frame is rejected 1518 since there is no path on which it can be sent.

CONCLUSION

While the invention has been particularly shown and described with reference to one or more embodiments thereof, it will be understood by those skilled in the art that various other changes in the form and details may be made without departing from the spirit and scope of the invention.

For example, the order of fields within the node record, path link, and device record may be readily altered for a particular embodiment of the invention. Similarly, the reverse pointers of the node record and the device record are present for convenience in inserting and removing records from the associated lists, while these confer advantages it is possible to construct a functional system with only forward links. If the number of devices addressed through a single node is limited, device links and the associated device link list pointers of the node records may be replaced by a plurality of device record pointers in the node records.

Node records have been described as accessed through node link records, device records through device link records, and paths through path link records. Each link record has pointers for linking into a linked list and pointers to associated node and device records. It is also possible to use a long fixed-length or a variable-length HBA-port record, node record, or device record; the longer or variable length record containing multiple pointers to other node, device, or node records of the database. Using long fixed-length or variable length records may, however, limit the number of nodes, devices and paths trackable by the database. Further, excessive delays and memory fragmentation may be encountered as variable-length record sizes are adjusted while adding nodes and devices to the database.

While the above description has focused on dispatch of frames from a node, switches of a switched fabric also have processors and must maintain a network topology database. Packets received by a switch may be routed on preferred or alternate paths by such a switch according to information in a network topology database of the present invention. Each such switch may also implement the probationary period of the present invention should paths through that switch be repaired. Switches implementing probationary periods on repaired paths may also promote probationary paths to normal operation in desperation when no alternative, normal status, paths remain available.

A computer program product is a computer readable memory device or media having recorded upon it computer readable instructions.

It should be understood that this description has been made by way of example, and that the invention is defined by the scope of the following claims.

What is claimed is:

1. An initiator node for a storage area network, the node intended to be coupled over the storage area network to at least one storage node having command queue capability, the initiator node comprising:
   at least one processor capable of executing instructions;
   a memory system having stored a current queue depth, and a maximum queue depth associated with each storage node of the at least one storage node;
   wherein the memory system stores
   instructions for initializing the maximum queue depth for the at least one storage node to a value dependent on a type of the at least one storage node,
   instructions for limiting the number of commands queued to a storage node of the at least one storage node to the current queue depth associated with the storage node, and
   instructions for dynamically adjusting the current queue depth associated with the storage node based upon queue refusals generated by the storage node and the maximum queue depth associated with the storage node.

2. The initiator node of claim 1, wherein the instructions for dynamically adjusting the current queue depth include instructions for adjusting the current queue depth associated with a storage node downwardly when the current queue depth is greater than a minimum queue depth and the storage node refuses to queue a command issued by the initiator node, and for adjusting the current queue depth upwardly when the current queue depth is less than the maximum queue depth associated with the storage node and that storage node has not refused to queue any commands issued by the initiator node for a determined period of time.

3. The initiator node of claim 2 wherein the instructions for dynamically adjusting the current queue depth include instructions for monitoring logins, and for adjusting the current queue depth downwardly when a login by an additional initiator node is recognized.

4. In a storage area network node, a method of controlling a maximum number of commands queued to a storage node comprising the steps of:
- maintaining a maximum queue depth associated with the storage node and initializing the maximum queue depth according to a type of the storage node;
- maintaining a count of outstanding commands that have been submitted to the storage node;
- maintaining a current queue depth associated with the storage node and initializing the current queue depth to a value not less than a minimum queue depth nor greater than the maximum queue depth;
- holding commands for later submission to the storage node if the count of commands that have been submitted is greater or equal to the current queue depth;
- adjusting the current queue depth associated with the storage node downwardly when the current queue depth is greater than the minimum queue depth and the storage node refuses to queue a command issued by the initiator node; and
- adjusting the current queue depth upwardly when the current queue depth is less than the maximum queue depth associated with the storage node and the storage node has not refused to queue any commands issued by the initiator node for a first predetermined period of time.

5. The method of claim 4, further comprising the step of adjusting the current queue depth associated with the storage node downwardly is permitted to occur no more than a predetermined number of times in a second predetermined period of time.

6. The method of claim 5, wherein the predetermined number of times is one.

7. The method of claim 5, wherein the first predetermined period of time is adjusted dynamically.

8. The method of claim 5, further comprising the steps of:
- maintaining a second maximum queue depth associated with a second storage node and initializing the second maximum queue depth according to a type of the second storage node;
- maintaining a second count of outstanding commands, indicating commands that have been submitted to the second storage node and have not completed; and
- maintaining a second current queue depth associated with the second storage node and initializing the second current queue depth to a value not less than a minimum queue depth nor greater than the second maximum queue depth.

9. The method of claim 5, wherein the step of initializing the current queue depth initializes the current queue depth to a value dependent upon a number of initiator nodes known to be logged-in to the storage area network.

10. An apparatus having computer readable instructions, the apparatus comprising:
- first maintenance means for maintaining a maximum queue depth associated with a storage node, the maximum queue depth initialized according to a type of the storage node;
- second maintenance means for maintaining a current queue depth associated with the storage node, the current queue depth initialized to a value not less than a minimum queue depth nor greater than the maximum queue depth;
- first adjustment means for adjusting the current queue depth associated with the storage node downwardly when the current queue depth is greater than the minimum queue depth and the storage node refuses to queue an issued command; and
- second adjustment means for adjusting the current queue depth associated with the storage node upwardly when the current queue depth is less than the maximum queue depth associated with the storage node and the storage node has not refused to queue any issued commands for a first predetermined period of time.

11. The apparatus of claim 10, wherein the first adjustment means adjusts the current queue depth associated with the storage node downwardly no more than a predetermined number of times in a second predetermined period of time.

12. The apparatus of claim 11, wherein the predetermined number of times is one.

13. The apparatus of claim 10, wherein the first predetermined period of time is adjusted dynamically based on whether the current queue depth is being adjusted upwardly and/or whether the current queue depth has been adjusted downwardly during the first predetermined period of time.

14. The apparatus of claim 10, further comprising:
- third maintenance means for maintaining a second maximum queue depth associated with a second storage node, the second maximum queue depth initialized according to a type of the second storage node; and
- fourth maintenance means for maintaining a second current queue depth associated with the second storage node, the second current queue depth initialized to a value not less than a minimum queue depth nor greater than the second maximum queue depth.

15. The apparatus of claim 10, wherein the current queue depth is initialized to a value dependent upon a number of initiator nodes logged-in to a storage area network.

16. The apparatus of claim 15, wherein the current queue depth is updated upon login of a new initiator node to the storage area network.

17. The apparatus of claim 10, further comprising:
- third maintenance means for maintaining a count of outstanding commands that have been submitted to the storage node; and
- means for holding commands for later submission to the storage node if the count of commands that have been submitted is greater or equal to the current queue depth.

18. The apparatus of claim 10, wherein the apparatus comprises a storage area network node.

19. The apparatus of claim 10, wherein the apparatus comprises a computer program product.

* * * * *